US012709404B2

(12) United States Patent
Tomlinson et al.

(10) Patent No.: US 12,709,404 B2
(45) Date of Patent: Aug. 18, 2026

(54) PUMP SYSTEM

(71) Applicant: Airbus Operations Limited, Bristol (GB)

(72) Inventors: Stephen Tomlinson, Bristol (GB); Dylan Vignola, Bristol (GB); Steve Belabbas, Bristol (GB); Steve Lawson, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 18/891,273

(22) Filed: Sep. 20, 2024

(65) Prior Publication Data

US 2025/0100704 A1 Mar. 27, 2025

(30) Foreign Application Priority Data

Sep. 21, 2023 (GB) ..................................... 2314450

(51) Int. Cl.

*B64D 37/28* (2006.01)
*B64D 37/30* (2006.01)
*F04D 1/06* (2006.01)
*F04D 7/02* (2006.01)
*F04D 13/14* (2006.01)

(Continued)

(52) U.S. Cl.

CPC ............ *B64D 37/28* (2013.01); *B64D 37/30* (2013.01); *F04D 7/02* (2013.01); *F04D 13/14* (2013.01); *F04D 15/00* (2013.01); *F04D 1/06* (2013.01); *F04D 15/0072* (2013.01);

(Continued)

(58) Field of Classification Search

CPC combination set(s) only.
See application file for complete search history.

(56) References Cited

U.S. PATENT DOCUMENTS 4,332,527 A 6/1982 Moldovan et al.
5,118,258 A 6/1992 Martin (Continued)

FOREIGN PATENT DOCUMENTS

CN 115270358 A 11/2022
CN 217926347 U 11/2022
WO 2021/075650 A1 4/2021

OTHER PUBLICATIONS

Search Report for GB2314450.4, dated Feb. 13, 2024, 4 pages.
Extended European Search Report for Application No. 24198226.3, nine pages, dated Feb. 3, 2025.

*Primary Examiner* — Binh Q Tran
(74) *Attorney, Agent, or Firm* — Nixon & Vanderhye, PC

(57) ABSTRACT

A pump system is disclosed including a first pump having a first inlet and a first outlet, and a second pump having a second inlet and a second outlet. The second pump is arranged in parallel with the first pump, and the first inlet and the second inlet are for fluidically coupling to one or more fluid reservoirs. A control system is coupled to the first pump and the second pump for controlling the operation of the first pump and the second pump simultaneously. The control system is configured to measure a value of a first pressure head at the first outlet, measure a value of a second pressure head at the second outlet, control the first pump to achieve a required output and control the second pump by providing a demand for the second pump to achieve a measured value of the second pressure head which equals the measured value of the first pressure head.

15 Claims, 5 Drawing Sheets

(51) Int. Cl.
*F04D 15/00* (2006.01)
*F04D 17/12* (2006.01)

(52) U.S. Cl.
CPC .......... *F04D 15/0094* (2013.01); *F04D 17/12* (2013.01); *F05D 2270/706* (2013.01)

(56) References Cited

U.S. PATENT DOCUMENTS

| | | | | |
|---|---|---|---|---|
| 6,655,152 | B2 | 12/2003 | Griffiths et al. | |
| 7,010,393 | B2 | 3/2006 | Mirsky et al. | |
| 7,588,422 | B2 | 9/2009 | Ochi et al. | |
| 8,205,597 | B2 | 6/2012 | Brocard et al. | |
| 9,816,509 | B2 | 11/2017 | Blaumann et al. | |
| 10,526,973 | B2 | 1/2020 | Waissi et al. | |
| 2009/0056324 | A1* | 3/2009 | Itakura | E02F 9/2235 91/532 |
| 2015/0275816 | A1* | 10/2015 | Pursifull | F02D 41/08 123/456 |
| 2016/0138473 | A1* | 5/2016 | Veilleux, Jr. | F02C 7/22 137/59 |
| 2017/0159666 | A1* | 6/2017 | Üresin | F04D 27/0276 |
| 2018/0003180 | A1 | 1/2018 | Raghavachari | |
| 2018/0073525 | A1* | 3/2018 | Udagawa | E02F 9/2296 |
| 2019/0055945 | A1* | 2/2019 | Coeckelbergs | F04C 25/02 |
| 2020/0102961 | A1* | 4/2020 | Fowler | F04D 13/06 |
| 2021/0010429 | A1 | 1/2021 | Brady | |
| 2022/0389944 | A1* | 12/2022 | Hironaka | F04C 14/02 |
| 2023/0026848 | A1* | 1/2023 | MacPherson | F15B 11/0426 |
| 2023/0069163 | A1 | 3/2023 | Donaldson | |
| 2023/0174222 | A1* | 6/2023 | Hagihara | F04B 17/03 244/102 A |
| 2023/0176563 | A1 | 6/2023 | Mokander et al. | |

* cited by examiner

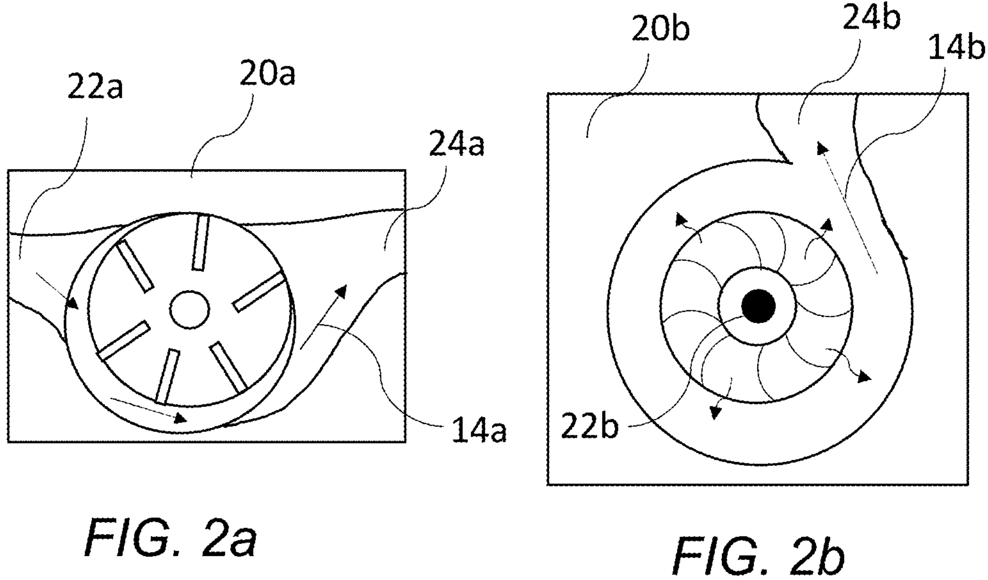
FIG. 2a
FIG. 2b
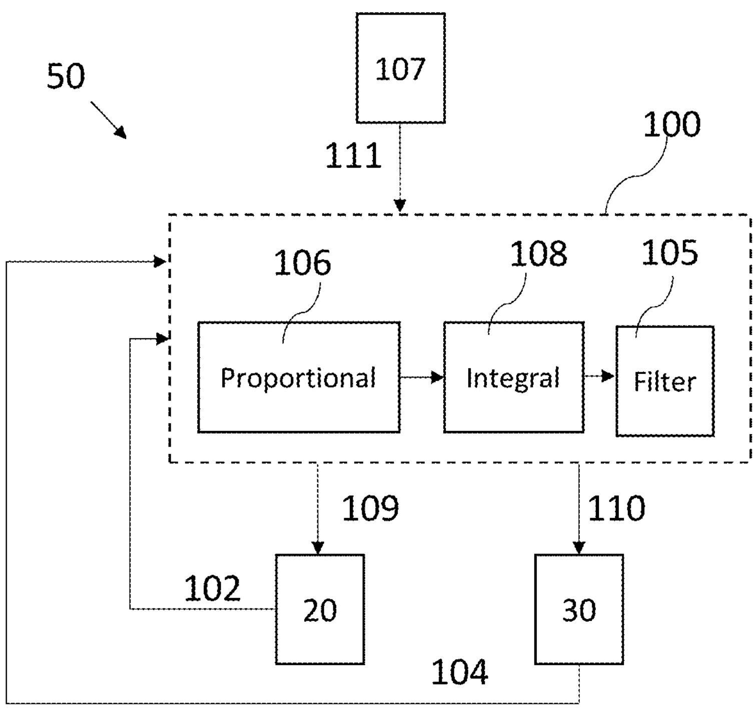
FIG. 3

PUMP SYSTEM

CROSS RELATED APPLICATION

This application claims priority to United Kingdom Patent Application GB 2314450.4, filed Sep. 21, 2023, the entire contents of which is hereby incorporated by reference.

FIELD OF THE INVENTION

The present invention relates to a pump system and a method of operating the pump system.

BACKGROUND OF THE INVENTION

The output of modern pumps (such as flow rate) can be modified to achieve a certain output depending on the application of the pump. While the output of such pumps is generally accurate, there can be minor variations between different pumps due to e.g. manufacturing tolerances. When multiple pumps are used in parallel in a single pumping system, this can lead to dead heading in the pump system, which can result in pump failure. It is therefore desirable to address this problem.

SUMMARY OF THE INVENTION

A first aspect of the invention provides a pump system comprising: a first pump having a first inlet and a first outlet; a second pump having a second inlet and a second outlet, wherein the second pump is arranged in parallel with the first pump, and the first inlet and the second inlet are for fluidically coupling to one or more fluid reservoirs; a control system coupled to the first pump and the second pump for controlling the operation of the first pump and the second pump simultaneously, wherein the control system is configured to: measure a value of a first pressure head at the first outlet; measure a value of a second pressure head at the second outlet; control the first pump to achieve a required output; and control the second pump by providing a demand for the second pump to achieve a measured value of the second pressure head which equals the measured value of the first pressure head.

Optionally, the pump system further comprises a fluid chamber downstream of the first outlet and the second outlet to be fed by both the first pump and the second pump, wherein the control system is further configured to: measure a third pressure head at the fluid chamber; and control the first pump by providing a demand for the first pump to achieve a measured value of the third pressure head which equals a required value of the third pressure head.

Optionally, the control system includes a first proportional and integral controller for setting the demand to the first pump, wherein the first proportional and integral controller has as inputs the measured value of the third pressure head and the required value of the third pressure head.

Optionally, the control system includes a second proportional and integral controller for setting the demand to the second pump, wherein the second proportional and integral controller has as inputs the measured value of the second pressure head and the required value of the second pressure head.

Optionally, the first and/or second proportional and integral controllers each have a lag-lead filter to achieve pole-zero cancellation.

Optionally, the pump system further comprises a first non-return valve between the first outlet and the fluid chamber, and a second non-return valve between the second outlet and the fluid chamber.

Optionally, the first pump and the second pump are substantially identical.

Optionally, the pump system further comprises a plurality of the second pumps each arranged in parallel with the first pump, wherein each second pump has a respective second outlet and a respective second inlet, each second inlet for fluidically coupling to the fluid reservoir(s), wherein the control system is coupled to each of the second pumps for controlling the second pumps simultaneously, and wherein the control system is further configured to: measure a value of a respective second pressure head at each respective second outlet; and control each of the second pumps by providing a demand for the respective second pump to achieve a measured value of the respective second pressure head which equals the measured value of the first pressure head.

Optionally, the first and second pumps are each rotary pumps.

Optionally, the first and second pumps are each centrifugal pumps.

A further aspect of the invention provides a fluid delivery system comprising: a pump system as described herein, and a fluid reservoir fluidically coupled to the first inlet and the second inlet.

Optionally, the fluid reservoir is a liquid fuel tank and the pump system is for delivering liquid fuel to a combustor.

Optionally, the fluid delivery system is an aircraft fuel system and the liquid fuel tank is a liquid hydrogen fuel tank for feeding to an aircraft propulsion engine.

A further aspect of the invention provides a method of operating a pump system, the pump system comprising a first pump having a first inlet and a first outlet and a second pump having a second inlet and a second outlet, wherein the second pump is arranged in parallel with the first pump, and wherein the first inlet and the second inlet are fluidically coupled to one or more fluid reservoirs, the method comprising: measuring a value of a first pressure head at the first outlet; measuring a value of a second pressure head at the second outlet; controlling the first pump to achieve a required output; and controlling the second pump by providing a demand for the second pump to achieve a measured value of the second pressure head which equals the measured value of the first pressure head such that the first pressure head and the second pressure head are the same in steady-state.

BRIEF DESCRIPTION OF THE DRAWINGS

Embodiments of the invention will now be described with reference to the accompanying drawings, in which:

FIGS. 2*a* and 2*b* show exemplary rotary and centrifugal pumps;

FIG. 3 shows a schematic representation of a controller;

DETAILED DESCRIPTION OF EMBODIMENT(S)

Figures 1A, 1B:
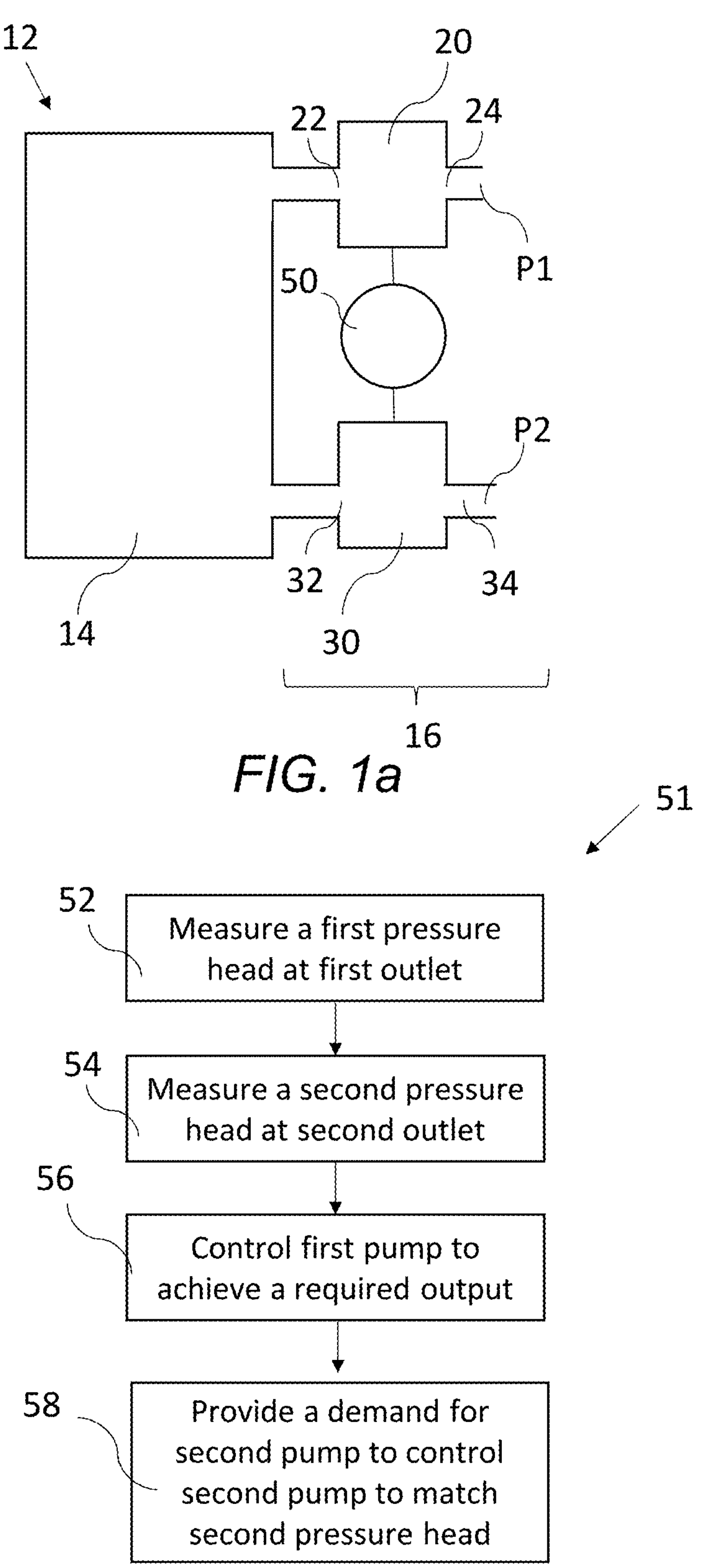
FIG. 1*a* shows a schematic representation of a pump system.
FIG. 1*b* shows a method of operating a pump system.

FIG. 1*a* shows a pump system 12 in greater detail. As shown, the pump system 12 has a first pump 20, a second pump 30, a fluid reservoir 14 and a control system 50.

The first pump has a first inlet 22 and a first outlet 24. Similarly, the second pump 30 has a second inlet 32 and a second outlet 34. The first inlet 22 of the first pump 20 and the second inlet 32 of the second pump 30 are fluidically coupled with the fluid reservoir 14. The first and second pumps 20, 30 form a pump arrangement 16. In this example, the pumps 20, 30 are both connected to a common (i.e. the same) fluid reservoir 14. In other examples, the pumps 20,30 may be connected to different fluid reservoirs 14.

The first and second pumps 20, 30 are operable to pump the contents within the fluid reservoir 14 through the respective inlets 22, 32 of the pumps 20, 30 and out of the respective outlets 24, 34 of the pumps. As shown, the second pump 30 is arranged in parallel with the first pump 20. The pumps 20, 30 may be connected to any suitable fluid chamber downstream of the pumps 20, 30 (discussed further below).

The pumps 20, 30 are controllable so that the input of the pumps 20, 30, such as the torque (i.e. the speed and/or power of the pumps 20, 30) can be modified. Altering the inputs of the pumps 20, 30, may affect the pressure head at the outlets 24, 34 of the pumps 20, 30. During operation, the outlet 24 of the first pump 20 has a first outlet pressure head P1. The flow rate of the pump 20 changes the first outlet pressure head P1 of the pump 20. Similarly, the outlet 34 of the second pump 30 has a second outlet pressure head P2. The second outlet pressure head P2 changes depending on the flow rate of the second pump 30. The first and second outlet pressure heads P1 and P2 are the static pressures of the outlets 24, 34, which is a dynamic variable of the pumps 20, 30.

Changing the output of the pumps 20, 30 may be necessary depending on the application of the pump system 12. The operation of the pumps 20, 30 is controlled by a control system 50 (shown schematically in FIG. 1*a*). The control system 50 is coupled to the first and second pump 20, 30.

The control system 50 is arranged to control the operation of both pumps 20, 30 simultaneously. In some examples, the pumps 20, 30 may be substantially identical. In other examples, the pumps 20, 30 may be different but operable to generate the same required output. The required outputs of the pumps 20, 30 (e.g. the speed or flow rate) may be manually selected by an operator, who can control the operation of the pumps through the control system 50.

The control system 50 ensures that the outputs of both pumps 20, 30 are substantially identical by creating a feedback loop system depending on the desired output of the first pump 20, and measuring a pressure head of each pump 20, 30. The method 51 of operating the pump system 12 is discussed in greater detail in relation to FIG. 1*b*.

The control system 50 is arranged to measure a value of the first pressure head P1 at the first outlet 24 at step 52. The control system 50 then measures a value of the second pressure head P2 at the second outlet 34 at step 54. The control system 50 may measure the pressure at the outlets 24, 34 of the pumps 20, 30 by any suitable means, such as by using a pressure transducer (not shown) that is electronically connected to the control system 50. In other examples, the pumps 20, 30 may have in-built sensor arrangements that measure the outlet pressures 24, 34 of the pumps 20, 30. In this example, the measured pressure is electronically communicated to the control system 50 by the pumps 20, 30. The control system 50 may continuously measure the first pressure head P1 and the second pressure head P2 throughout the remaining steps.

The control system 50 then controls the first pump 20 to achieve a required output at step 56. As mentioned above, the required output may be the speed of the pump 20, the flow rate of the pump, the power output of the pump or any other parameter. The output of the first pump 20 determines the rate at which the contents from the fluid reservoir 14 is pumped out by the first pump 20. The required output of the first pump 20 is variable and may be determined by an operator, or it may be pre-determined depending on the application of the pump system 12. By operating at the required output, the first pressure head P1 of the first pump 20 will reach and stabilise at a specific pressure head P1. The first pump 20 therefore operates at a steady state at the required output.

Once the first pump 20 is operating to produce the required output, the control system 50 controls the second pump 30 by sending a demand to the second pump 30 so that a measured value of the second pressure head P2 matches the first pressure head P1 at step 58. The demand is an electrical control signal that causes the second pump 30 to operate at a certain parameter to achieve a second pressure head P2 that matches the first pressure head P1. The control system 50 monitors the pressure heads P1 and P2 to ensure that the second pressure head P2 matches the first pressure head P1. The control system's demand signal may cause the second pump 30 to operate at a specific speed, or flow rate to ensure that the second pressure head P2 equals the measured value of the first pressure head P1. The demand may cause the second pump 30 to operate at a different speed or flow rate to the first pump 20 in order to ensure that the second pressure head P2 matches the first pressure head P1.

The pumps 20, 30 may be any suitable type of rotary pump 20*a* with a respective inlet 22*a* and an outlet 24*a* as shown in FIG. 2*a*. The flow of the liquid contained in the fluid reservoir 14 is indicated generally by the arrows 14*a*.

The first and second pumps 20, 30 may be centrifugal pumps 20*b*, with a respective inlet 22*b* and respective outlet 24*b*, as shown in FIG. 2*b*. The flow of liquid is indicated generally by the arrows 14*b*. Using centrifugal pumps 20*b* in the pump system 16 is advantageous because centrifugal pumps 20*b* ensure positive pressure throughout the pump system 12 regardless of the changes in temperature or positioning of the pump system 12 (which may vary depending on the application of the pump system 12). Although the FIGS. 2*a* and 2*b* show the first pump 20 as exemplary rotary pump 20*a* and a centrifugal pump 20*b*, it will be understood that both the first and second pumps 20, 30 may be any rotary, e.g. centrifugal pump, or other pump.

FIG. 3 shows the control system 50 in greater detail. The control system 50 comprises a controller 100 including a proportional controller 106 and an integral controller 108. The controller 100 is electronically coupled to the pumps 20, 30. As shown in FIG. 3, the controller receives a first input signal 102 containing information indicative of the measured first pressure head P1 of the first pump 20. The controller 100 also receives a second input 104 containing information indicative of the measured second pressure head P2 of the second pump 30. The controller 100 further receives a demand signal 111 comprising information indicative of a required first pressure head P1, which may be referred to as a first required output. The demand signal 111 may be output by a processor 107 which is separate to the controller 100 as shown in FIG. 3, or which is part of the controller 100.

The controller 100 determines a first pressure discrepancy based on the measured first pressure head P1 and the first required output. The first pressure discrepancy may be equal to the difference between the measured first pressure head P1 and the first required output. The controller 100 then outputs a first pump signal 109 to adjust the first pump output based on the first pressure discrepancy.

The controller 100 also determines a second pressure discrepancy based on the measured first pressure head P1 and the measured second pressure head P2. The second pressure discrepancy may be equal to the difference between the measured first pressure head P1 and the measured second pressure head P2. The controller 100 then outputs a second pump signal 110 to adjust the second pump output based on the second pressure discrepancy. The second pump output is adjusted to be equal to the first measured pressure head P2. It will be appreciated that the first pressure discrepancy and the second pressure discrepancy may be determined simultaneously, and that the control method may be repeated continuously to monitor and control the outputs of the first and second pumps 20, 30.

The proportional and integral controller 100 may also include a lag-lead filter 105. The lag-lead filter 105 is arranged to achieve pole zero cancellation. The lag-lead filter 105 therefore helps minimise the system oscillations as the second pressure head P2 stabilises to equal the required first pressure head P1. This helps stabilise both the first pump output and the second pump output at a steady state output. The controller 100 acts on the accumulated error within the pump system 16 to ensure that the second pressure head P2 stabilises quickly if the first pressure head P1 changes.

Figure 4:
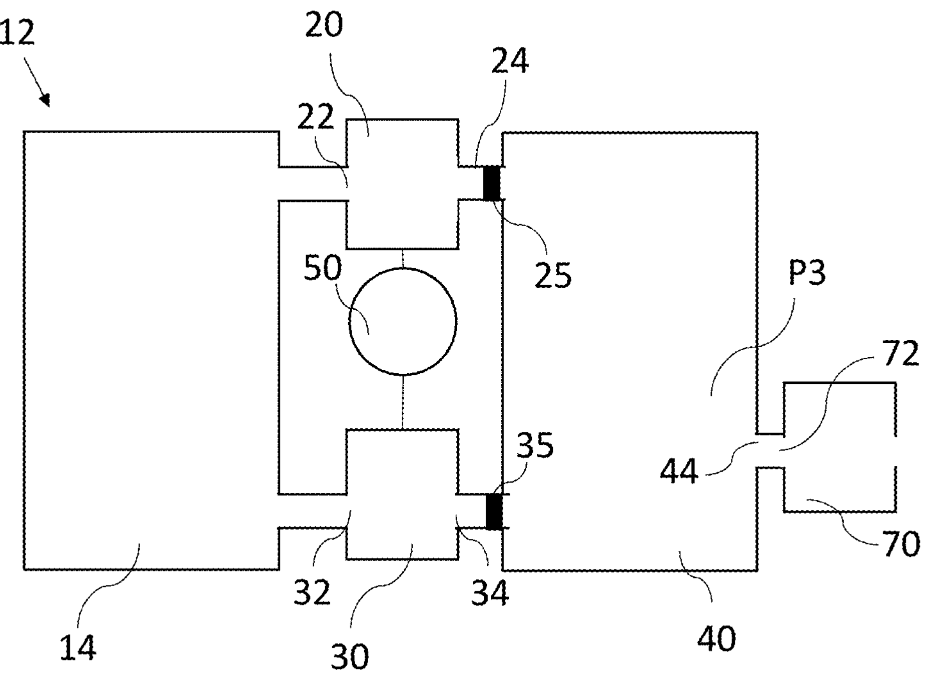
FIG. 4 shows another exemplary pump system.

This arrangement therefore accounts for any manufacturing differences between the first and second pumps 20, 30, which may affect the outlet pressure head P1, P2 of each respective pump. The control system 50 may allow the pump outlets 24, 34 to be identical under all conditions by enabling the pumps 20, 30 to operate at different speeds. This arrangement is particularly advantageous when the pumps 20, 30 are connected to a fluid chamber 40 downstream of the first outlet 24 and the second outlet 34, as shown in FIG. 4.

The first outlet 24 of the first pump 20 is fluidically coupled to a fluid chamber 40. Similarly, the second outlet 34 of the second pump 30 is fluidically coupled to the fluid chamber 40. As shown, the fluid chamber 40 is downstream of the first and second outlets 24, 34 and is fed by both the first and second pump 20, 30. The fluid chamber 40 therefore receives fuel from the fluid reservoir 14 through the first and second pumps, 20, 30. The first pump 20 has a first non-return valve 25 between the first outlet 24 and the fluid chamber 40. Similarly, the second pump 30 has a second non-return valve 35 between the second outlet 34 and the fluid chamber 40. This arrangement prevents any liquid pumped from the fluid reservoir 14 from returning through the pumps 20, 30.

The outlet 44 of the fluid chamber 40 is connected to a third pump 70 that has a third inlet 72 that is connected to the fluid chamber 40. In this arrangement, the first and second pumps 20, 30 have outlet pressures P1 and P2 that are lower than the outlet pressure of the third pump 70. The pumps 20, 30 are located near the fluid reservoir 14, while the third pump 70 is arranged to pump the liquid in the fluid chamber 40 further downstream of the third pump 70.

By using the control system 50 to operate the first and second pumps 20, 30 as described above, the control system 50 prevents any differences between the outlet pressure (i.e. the first pressure head P1 and the second pressure head P2) of the pumps 20, 30. If the first pressure head P1 and the second pressure head P2 of the pumps were different, the flow from the pump 20, 30 with the lower outlet pressure would be blocked by the flow from the pump 20, 30 with the higher outlet pressure. This prevents the non-return valve 25, 35 of the pumps with the lower outlet pressure from opening (so called "dead-heading"), and may lead to rapid pump failure or damage.

Figure 5:
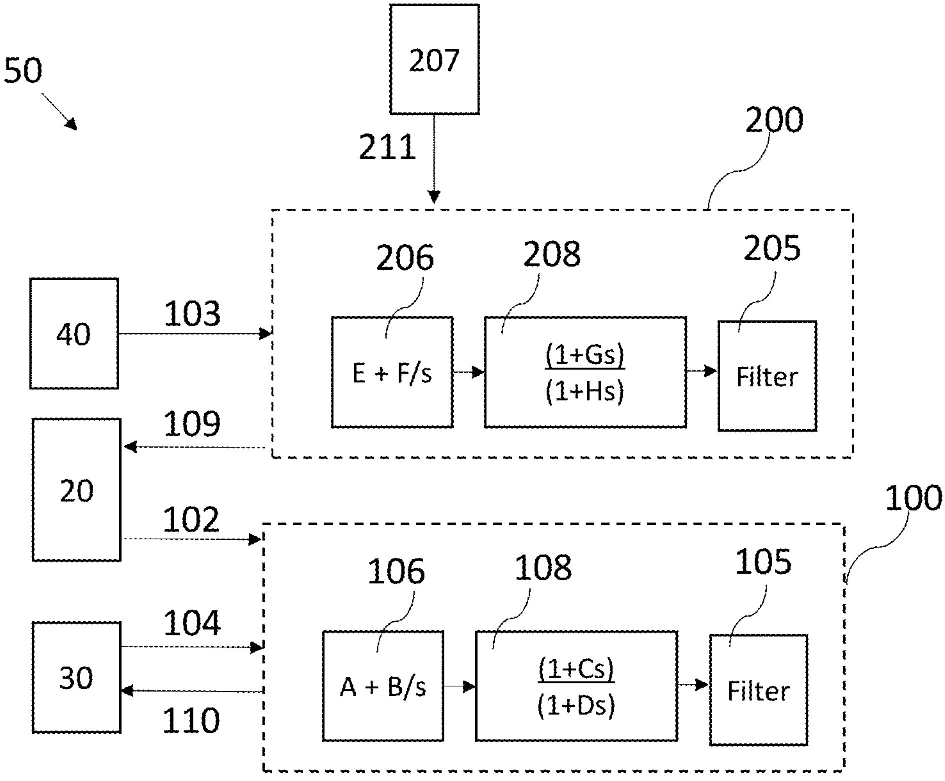
FIG. 5 shows another schematic representation of a controller.

In the example shown in FIG. 4, the control system 50 is arranged to control the operation of the first pump 20 depending on a required pressure of the fluid chamber 40, which may be referred to as a required third pressure. This may be required in certain applications, where the liquid in the fluid reservoir 14 must be at a specific pressure before being pumped by the third pump 70. The control system 50 in FIG. 5 is arranged to measure a third pressure P3 at the fluid chamber 40. The third pressure P3 may be the internal pressure inside the fluid chamber 40 or may be determined at an outlet 44 of the fluid chamber 40. Preferably, the third pressure P3 is measured at any position downstream of the non-return valves. The control system 50 operates the first pump 20 to adjust the third pressure P3 to match the required third pressure. As adjusting the first pump 20 will also affect the operation of the second pump 20, the control system 50 factors in the operation of both pumps 20, 30 when setting the demand for the first pump 20.

The controller 100 shown in FIG. 5 is identical to that described with reference to FIG. 3. Components and signals common to both control systems have common reference numerals and for brevity will not be described again here.

As shown in FIG. 5, the control system 50 may further comprise a second controller 200. The second controller 200 comprises a proportional controller 208 and an integral controller 206 and may also comprise a lag-lead filter 205 to achieve pole zero cancellation. The second controller 200 receives a third input signal 103 containing information indicative of the measured third pressure P3 of the fluid chamber 40. The second controller 200 also receives a third demand signal 211 containing information indicative of a required value of the third pressure. The third demand signal 211 may be generated by a processor 207 separate to the second controller 200, or the processor 207 may be part of the second controller 200. The second controller 200 determines the first required output based on the measured third pressure P3 and the required value of the third pressure. The second controller 200 then outputs the first pump signal 109 arranged to adjust the first pump output to match the first required output.

The controller 100 then operates as described previously with reference to FIG. 3 to control the first pump output to match the first required output, and to control the second pump output to match the measured first pump output. The control system 50 can therefore control the operation of the first and second pump 20, 30 through the controller 100 and the second controller 200.

Figure 6:
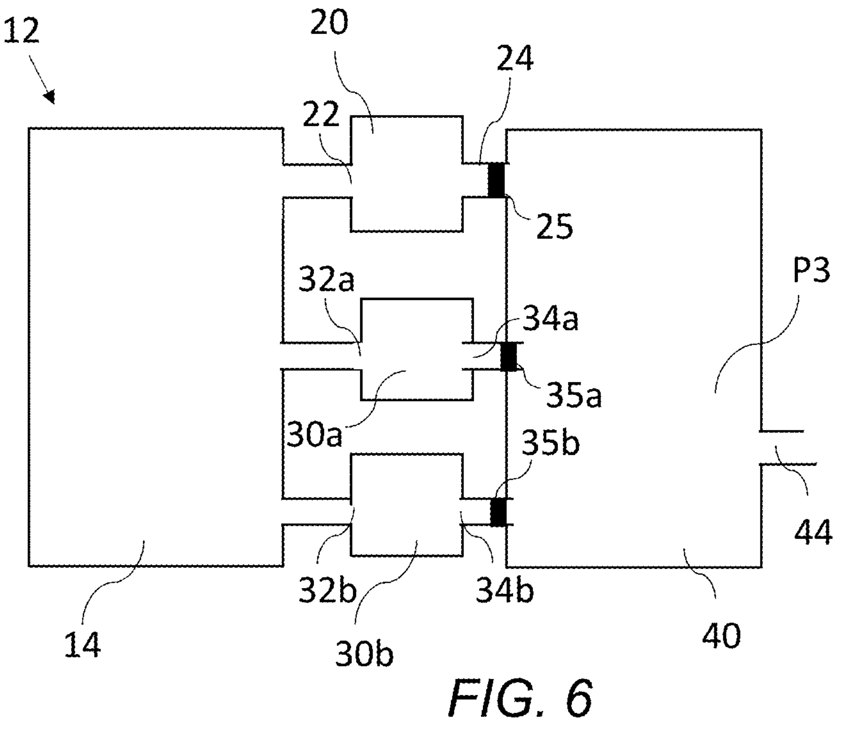
FIG. 6 shows another exemplary pump system.

In the examples discussed above, the pump system 12 includes only a singular second pump 30. However, the pump system 12 may include a plurality of second pumps 30*a*, 30*b* that are arranged in parallel with the first pump 20. In the example shown in FIG. 6, there are two second pumps 30*a*, 30*b*, which each have a respective inlet 32*a*, 32*b* and outlet 34*a*. 34*b*. As shown, each inlet 32*a*, 32*b* of the second pumps are fluidically coupled to the fluid reservoir 14, and the control system (not shown) is connected to each of the second pumps to control the function of the second pumps 30*a*, 30*b* simultaneously.

The control system 50 is arranged to control the operation of the second pumps 30*a*, 30*b* in an identical way as described above. In this example, however, the control system 50 is arranged to measure a value of a respective second pressure head at each respective second outlet 34*a*, 34*b*. The control system 50 then provides a demand for each second pump 30*a*, 30*b* so that each second pump 30*a*, 30*b* achieves a measured value of the respective second pressure head that equals the measured value of the first pressure head P1. The pump system 12 and the control system 50 therefore can be scaled to include any number of second pumps 30*a*, 30*b*. This arrangement also enables each second pump 30*a*, 30*b* to be positioned remotely from each other. The pump system 12 therefore can have a flexible arrangement depending on the application of the pump system 12.

Figure 7:
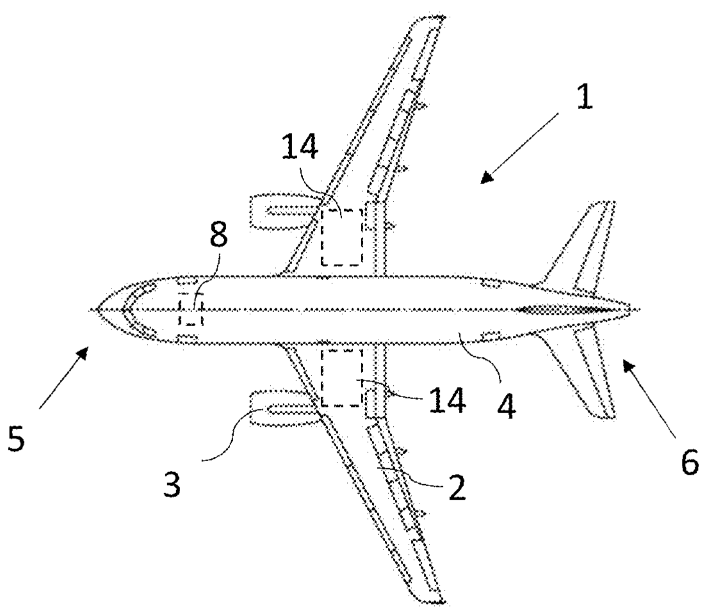
FIG. 7 shows an aircraft.

The pump system 12 described herein may be used for pumping any suitable liquid and therefore may be used in a wide variety of applications. For example, the pump system 12 may be used on ships, for flood relief, in automotive applications, water systems, or in an aircraft 1 as shown in FIG. 7.

As shown, the aircraft 1 has a pair of wings 2 carrying a propulsion system in the form of propulsion engines 3, a fuselage 4, a nose end 5 and a tail end 6. The aircraft 1 is a typical jet passenger transonic transport aircraft but the invention is applicable to a wide variety of fixed wing aircraft types, including commercial, military, passenger, cargo, jet, propeller, general aviation etc.

Figure 8:
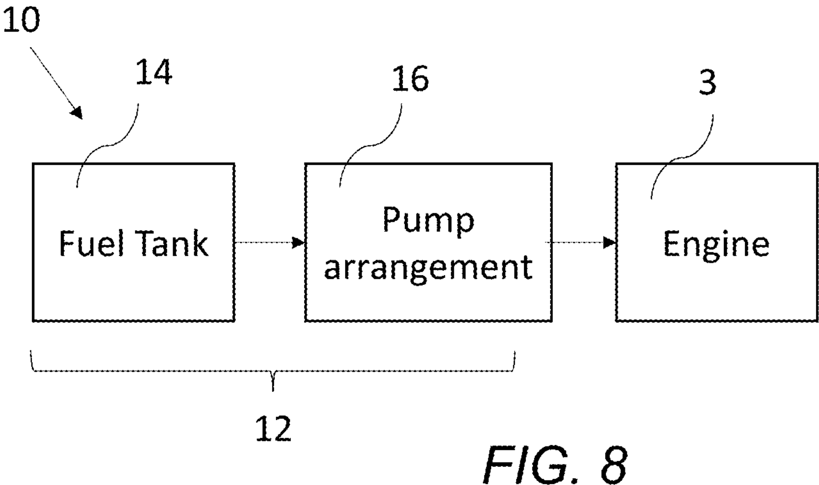
FIG. 8 shows an exemplary fuel delivery system.

The pump system 12 described above forms part of a fuel system 10 that is arranged to deliver fuel to the engines 3 (as shown in FIG. 8). In this arrangement, the fluid reservoir 14 is a fuel tank that is connected to the pumping arrangement 16. The fuel tanks 14 in FIG. 7 are only indicated schematically and can be located at any point of the aircraft, such as the in the fuselage 4. As shown schematically in FIG. 8, the pump system 12 is arranged to feed the fuel from the fuel tank 14 to the engines 3. In this example, the aircraft 1 is a hydrogen fueled aircraft, and the fuel tanks 14 contain liquid hydrogen. However, in other examples, the fuel tanks 14 may include aviation fuel.

As described above, the first and second pumps 20, 30 are operable to pump the contents within the fuel tank 14 (i.e. liquid hydrogen) through the respective inlets 22, 32 of the pumps 20, 30 and out of the respective outlets 24, 34 of the pumps, towards the engine 3. Changing the output of the pumps 20, 30 may be necessary during different phases of flight of the aircraft 1, which changes the rate of combustion in the engines 3.

In this example, the control system 50 is coupled to the first and second pump 20, 30, and forms part of the aircraft avionics system 8 (shown in FIG. 7). The required outputs of the pumps 20, 30 (e.g. the speed or flow rate) may be manually selected by a pilot, who can control the operation of the pumps through the avionics system 8 and the control system 50.

The pumps 20, 30 are located near the fuel tank 14 while the third pump 70 is arranged to force fuel into a combustion chamber downstream of the third pump 70 (not shown). The desired third pressure P3 in the fluid chamber 40 ensures that liquid hydrogen from the fuel tank 14 is delivered to the engine 3 by the third pump 70 at a suitable pressure for combustion. The desired third pressure P3 may be any suitable pressure.

Using a rotary pump in the pump arrangement 16 (as shown in FIG. 2*a*) is advantageous for use in an aircraft 1 because it can be used in a pressurised environment (such as a pressurised fuel environment in the aircraft 1) to provide a steady flow of fuel from the fuel tank 14 to downstream fluid chambers. Similarly, using a centrifugal pump (as shown in FIG. 2*b*) in the pump arrangement 16 is advantageous as the operation of the pump is not affected by the temperature, altitude or flight altitude of the aircraft 1. Centrifugal pumps also help prevent vapor lock in the fuel system 10.

Although the operation of the control system 50 and the pump system 12 has been described in greater detail in relation to a hydrogen fueled aircraft 1, it will be understood that the control system 50 and pump system 12 may be utilised for any suitable pump system.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A pump system, comprising:
- a first pump having a first inlet and a first outlet;
- a second pump having a second inlet and a second outlet, wherein the second pump is arranged in parallel with the first pump, and the first inlet and the second inlet are for fluidically coupling to one or more fluid reservoirs;
- a control system coupled to the first pump and the second pump for controlling the operation of the first pump and the second pump simultaneously,
- wherein the control system is configured to:
  - measure a value of a first pressure head at the first outlet;
  - measure a value of a second pressure head at the second outlet;
  - control the first pump to achieve a required output; and
  - control the second pump by providing a demand for the second pump to achieve a measured value of the second pressure head which equals the measured value of the first pressure head.

2. The pump system according to claim 1, further comprising a fluid chamber downstream of the first outlet and the second outlet and to be fed by both the first pump and the second pump, and wherein the control system is further configured to:
- measure a third pressure head at the fluid chamber; and
- control the first pump by providing a demand for the first pump to achieve a measured value of the third pressure head which equals a required value of the third pressure head.

3. The pump system according to claim 2, wherein the control system includes a first proportional and integral controller for setting the demand to the first pump, wherein the first proportional and integral controller has as inputs the measured value of the third pressure head and the required value of the third pressure head.

4. The pump system according to claim 1, wherein the control system includes a second proportional and integral controller for setting the demand to the second pump, wherein the second proportional and integral controller has as inputs the measured value of the second pressure head and the required value of the second pressure head.

5. The pump system according to claim 3, wherein first and/or second proportional and integral controllers each have a lag-lead filter to achieve pole-zero cancellation.

6. The pump system according to claim 1, further comprising a first non-return valve between the first outlet and the fluid chamber, and a second non-return valve between the second outlet and the fluid chamber.

7. The pump system according to claim 1, wherein the first pump and the second pump are substantially identical.

8. The pump system according to claim 1, further comprising a plurality of the second pumps each arranged in parallel with the first pump, wherein each second pump has a respective second outlet and a respective second inlet, each second inlet for fluidically coupling to the fluid reservoir(s), wherein the control system is coupled to each of the second pumps for controlling the second pumps simultaneously, and wherein the control system is further configured to:

measure a value of a respective second pressure head at each respective second outlet; and control each of the second pumps by providing a demand for the respective second pump to achieve a measured value of the respective second pressure head which equals the measured value of the first pressure head.

9. The pump system according to claim 1, wherein the first and second pumps are each rotary pumps.

10. The pump system according to claim 9, wherein the first and second pumps are each centrifugal pumps.

11. A fluid delivery system comprising:

the pump system according to claim 1; and a fluid reservoir fluidically coupled to the first inlet and the second inlet.

12. The fuel system comprising the fluid delivery system according to claim 11, wherein the fluid reservoir is a liquid fuel tank and the pump system is for delivering liquid fuel to a combustor.

13. The fuel system according to claim 12, wherein the fuel system is an aircraft fuel system and the liquid fuel tank is a liquid hydrogen fuel tank for feeding to an aircraft propulsion engine.

14. A method of operating a pump system, the pump system comprising a first pump having a first inlet and a first outlet, a second pump having a second inlet and a second outlet, wherein the second pump is arranged in parallel with the first pump, wherein the first inlet and the second inlet are fluidically coupled to one or more fluid reservoirs, the method comprising:

measuring a value of a first pressure head at the first outlet;

measuring a value of a second pressure head at the second outlet;

controlling the first pump to achieve a required output; and controlling the second pump by providing a demand for the second pump to achieve a measured value of the second pressure head which equals the measured value of the first pressure head such that the first pressure head and the second pressure head are the same in steady-state.

15. A pump system, comprising:

a first pump having a first inlet and a first outlet;

a second pump having a second inlet and a second outlet, wherein the second pump is arranged in parallel with the first pump, and the first inlet and the second inlet are for fluidically coupling to one or more fluid reservoirs;

a control system coupled to the first pump and the second pump for controlling the operation of the first pump and the second pump simultaneously, wherein the control system is configured to:

measure a value of a first pressure head at the first outlet;

measure a value of a second pressure head at the second outlet;

control the first pump to achieve a required output; and control the second pump by providing a demand for the second pump based on a calculated pressure discrepancy between the measured value of the first pressure head and the measured value of the second pressure head, to achieve a measured value of the second pressure head which equals the measured value of the first pressure head.

* * * * *